June 13, 1933.    R. F. DOW    1,913,872
SLACK TAKE-UP DEVICE
Filed May 4, 1929    2 Sheets-Sheet 1
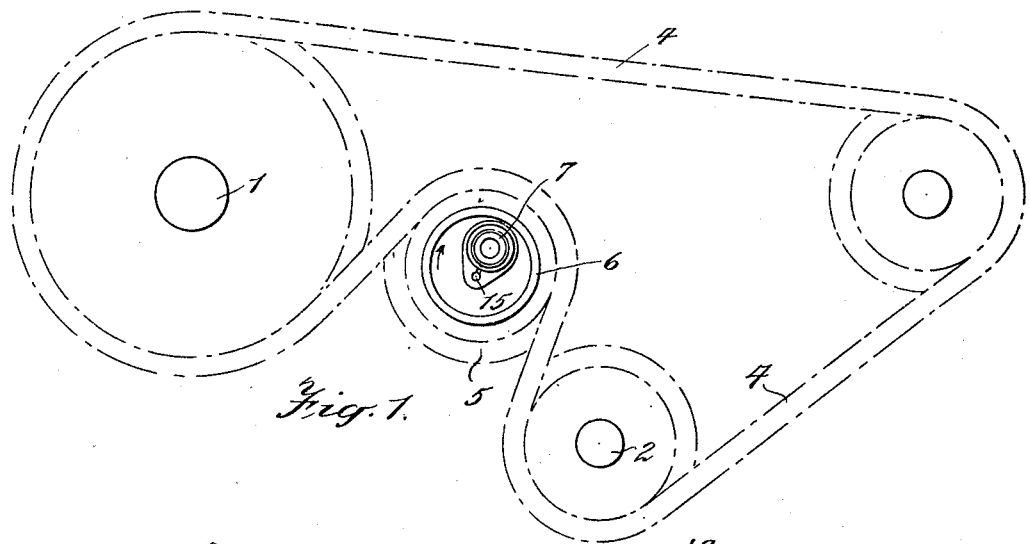
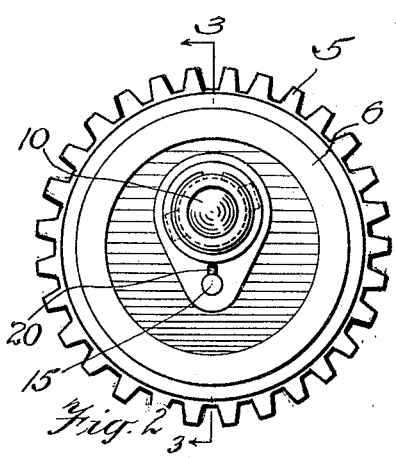
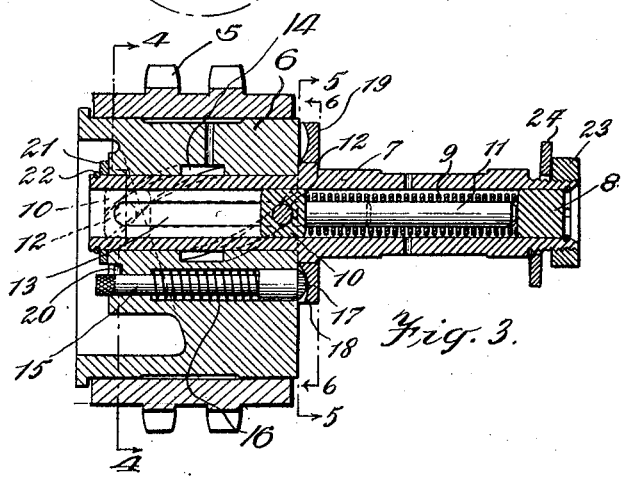
INVENTOR
Richard F. Dow
BY
Gifford, Scull & Burgess
ATTORNEYS

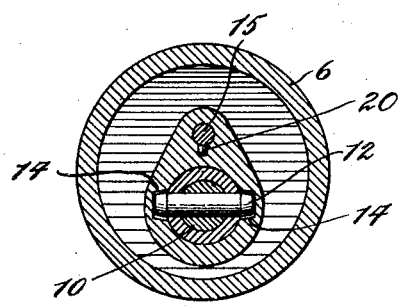
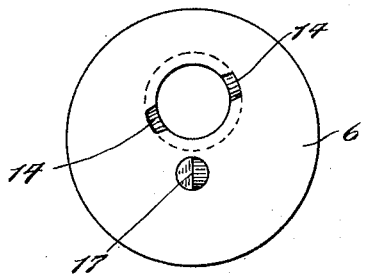
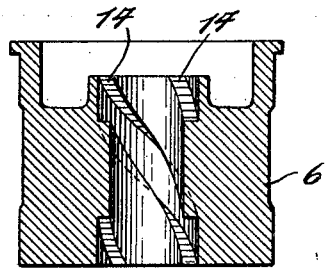
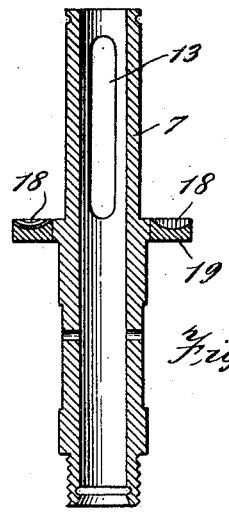
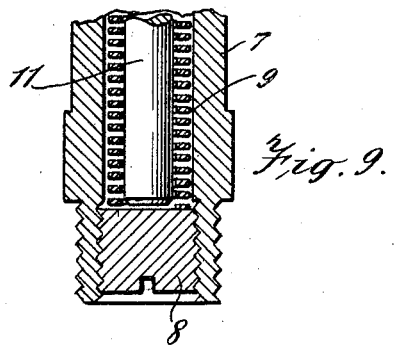

Patented June 13, 1933

1,913,872

UNITED STATES PATENT OFFICE

RICHARD F. DOW, OF HARTFORD, CONNECTICUT, ASSIGNOR TO THE WHITNEY MFG. CO., OF HARTFORD, CONNECTICUT, A CORPORATION OF CONNECTICUT

SLACK TAKE-UP DEVICE

Application filed May 4, 1929. Serial No. 360,550.

This invention relates to a novel and improved form of slack take-up device, and will be best understood from the following description and the annexed drawings, in which I have shown a selected embodiment of the invention and in which;

Fig. 1 is a diagrammatic view of a chain drive having my invention employed therewith.

Fig. 2 is a face view of the take-up device appearing in Fig. 1.

Fig. 3 is a section on the line 3—3 of Fig. 2, showing the parts in initial position.

Fig. 4 is a section on the line 4—4 of Fig. 3.

Fig. 5 is a section on the line 5—5 of Fig. 3, looking in the direction of the arrows.

Fig. 6 is a section on the line 6—6 of Fig. 3.

Fig. 7 is a view corresponding to Fig. 4 but showing the parts in a different position.

Fig. 8 is a longitudinal sectional view through the bearing.

Fig. 9 is a fragmentary longitudinal sectional view through part of the pivot for supporting the bearing, showing a modified form of abutment.

Fig. 10 is a section on the line 5—5 of Fig. 3, but looking in the opposite direction from that indicated by the arrows, and with parts removed.

Fig. 11 is a longitudinal sectional view through the pivot, without the parts usually contained therein.

The invention finds particular utility in connection with drives for automobiles, and the like, but may be used wherever it is necessary to automatically take up the slack in a belt or chain. For the sake of simplicity, I will hereinafter refer to a chain, although it is to be understood that by so doing I do not intend to limit the use of the invention to a chain drive, to the exclusion of a belt drive.

Referring first to Fig. 1, I have shown therein a diagrammatic chain drive consisting of the three shafts, 1, 2 and 3, driven in unison by a chain 4 which may engage suitable sprockets on the different shafts. Slack may be taken up by my device, which is shown as disposed between the shafts 1 and 2, and engaging the length of chain between these shafts. The take-up device comprises an idler sprocket 5 which rotates freely upon a bearing 6, this bearing being eccentrically mounted on a pivot 7 upon which it is adapted to rotate.

In the form shown, the pivot comprises a sleeve, the construction of which is best shown in Figs. 3 and 11 and which has its outer end closed by a plug 8 forming an abutment for a compression spring 9. This plug may be held in position by a spring washer, as indicated in Fig. 3, or may be threaded into the sleeve, as shown in Fig. 9. The other abutment for this spring consists of a block 10 connected to a rod 11 disposed in the sleeve. The block 10 has oppositely disposed pins 12 extending through longitudinally disposed slots 13 in the sleeve 7 and into spiral grooves 14 in the bearing, whereby longitudinal movement of the block 10 will cause rotary movement of the bearing.

Slidably mounted in the bearing and substantially parallel to its pivot is a pawl pin 15 urged towards the right of Fig. 3 by a spring 16 and having at its right-hand end a tooth 17. This tooth engages with ratchet teeth 18 formed by a plurality of recesses on the face of a flange 19 formed on the sleeve, this engagement preventing movement of the bearing 6 in a counter-clockwise direction, as viewed in Fig. 1.

The left-hand end of the pin as it appears in Fig. 3, is provided with a knurled surface whereby it may be drawn to the left to disengage the teeth 18, and this end of the pin is also provided with a transverse lock pin 20 normally received in a slot in the bearing, whereby upon withdrawal of the pin 15 towards the left, it may be turned and thus the locking pin will engage the bearing and prevent further engagement of the tooth 17 with the teeth 18.

The sleeve may be secured to the bearing by any suitable means such as a washer 21 engaging the bearing and secured on the sleeve by means of a spring-lock washer 22 engaging in a recess in the sleeve. Any suitable means such as a nut 23 and a spring lock washer 24 may be used for mounting the pivot in a suitable bearing, it being understood that the pivot is to be held against rotation by any desired means.

In operation, the pin 15 is first pulled towards the left in Fig. 3 to cause disengagement of the tooth 17 from the teeth 18. Next, the block 10 is forced to the right, as seen in Fig. 3, by any suitable tool, thus compressing the spring 9 and simultaneously causing rotation of the bearing in a counter-clockwise direction to the position shown in Fig. 1. The chain is then threaded over the idler which is mounted on the bearing 6, and the pin 15 returned to operative position. As slack develops in the reach of chain between the shafts 1 and 2, this slack will be automatically taken up by rotation of the bearing 6 in a clockwise direction, as viewed in Fig. 1, and as indicated by the arrow in that figure. This rotation is of course caused by expansion of the spring 9.

The slack will be taken up until the pins 12 reach the outer limit of their movement, the outer position of the pin and the block 10 being shown in dotted lines in Fig. 3, and in full lines in Fig. 7. Backward movement in a counter-clockwise direction and consequent slackening of the chain will be resisted by engagement between the pins 12 and the sides of the grooves in which they are received. The pitch of the grooves 14 is such that any ordinary force tending to cause rotation of the bearing will be insufficient to overcome the resistance of the spring 9 to such rotation. The pawl and ratchet arrangement positively prevents backward movement under any circumstances. This arrangement may be omitted, but is preferably used to prevent backward movement and consequent slackening of the chain due to sudden shocks.

While I have shown the invention as embodied in a specific form, it is to be understood that various changes in details may be made without departing from the scope of the invention, and I therefore do not intend to limit myself except by the appended claims.

I claim:—

1. A slack take-up device comprising an idler adapted to engage a chain, a bearing on which said idler is rotatably mounted, a sleeve forming a pivot for said bearing and disposed eccentrically to its axis, a block slidably mounted within the sleeve and having transverse pins received in longitudinal slots in the sleeve and in spiral grooves in the bearing, and a spring urging said block towards one end of the sleeve.

2. A slack take-up device comprising an idler adapted to engage a chain, a bearing on which said idler is rotatably mounted, a sleeve forming a pivot for said bearing and disposed eccentrically to its axis, a block slidably mounted within the sleeve and having transverse pins received in longitudinal slots in the sleeve and in spiral grooves in the bearing, and a spring urging said block towards one end of the sleeve, said end being open, whereby the block may be moved in the other direction by a suitable tool.

3. A slack take-up device comprising an idler adapted to engage a chain, a bearing on which said idler is rotatably mounted, a sleeve forming a pivot for said bearing and disposed eccentrically to its axis, a block slidably mounted within the sleeve and having transverse pins received in longitudinal slots in the sleeve and in spiral grooves in the bearing, and a spring urging said block towards one end of the sleeve, the pitch of said grooves being such as to prevent easy movement of the block against the action of the spring by rotation of the bearing.

4. A slack take-up device comprising an idler adapted to engage a chain, a bearing on which said idler is rotatably mounted, a sleeve forming a pivot for said bearing and disposed eccentrically to its axis, a block slidably mounted within the sleeve and having transverse pins received in longitudinal slots in the sleeve and in spiral grooves in the bearing, a spring urging said block towards one end of the sleeve, a flange on the sleeve in proximity to the bearing and having ratchet teeth facing the bearing, and a pawl pin slidably mounted in the bearing and adapted to cooperate with said teeth, for the purpose set forth.

5. A slack take-up device comprising an idler adapted to engage a chain, a bearing on which said idler is rotatably mounted, a sleeve forming a pivot for said bearing and disposed eccentrically to its axis, a block slidably mounted within the sleeve and having a plurality of transversely extending pins spaced apart around said block and disposed in longitudinal slots in the sleeve and in spiral grooves in the bearing, and a spring urging said block towards one end of the sleeve.

6. A slack take-up device comprising an idler adapted to engage a chain, a bearing on which said idler is rotatably mounted, a sleeve forming a pivot for said bearing and disposed eccentrically to its axis, a block slidably mounted within the sleeve and having transverse pins received in longitudinal slots in the sleeve and in spiral grooves in the bearing, a spring urging said lock towards one end of the sleeve, a flange on the sleeve in proximity to the bearing and having ratchet teeth facing the bearing, a pawl pin slidably mounted in the bearing and adapted to cooperate with said teeth, and means to hold said pawl pin out of engagement with said teeth.

7. A slack take-up device comprising an idler adapted to engage a chain, a bearing on which said idler is rotatably mounted, a pivot supporting said bearing and disposed eccentrically to its axis, a compression spring disposed coaxially with said pivot, a pin adapted to be moved by the action of said spring, means confining the movement of the pin to a path parallel with the axis of the pivot, a spiral groove in said bearing in which said pin is received, whereby said movement of the pin by said spring will cause rotation of the bearing in one direction on the pivot, and a pawl and ratchet device preventing rotation of the bearing in the other direction.

RICHARD F. DOW.